(12) United States Patent
Iantosca et al.

(10) Patent No.: US 8,983,827 B2
(45) Date of Patent: Mar. 17, 2015

(54) LINGUISTICAL ANALYTIC CONSOLIDATION FOR MOBILE CONTENT

(71) Applicant: International Business Machines Corporation, Armonk, NY (US)

(72) Inventors: Michael J Iantosca, Wake Forest, NC (US); Jana H Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/626,706

(22) Filed: Sep. 25, 2012

(65) Prior Publication Data

US 2014/0088953 A1  Mar. 27, 2014

(51) Int. Cl.
  *G06F 17/27* (2006.01)
  *G06F 17/20* (2006.01)
  *G06F 17/21* (2006.01)

(52) U.S. Cl.
  CPC .......... *G06F 17/274* (2013.01); *G06F 17/2795* (2013.01)
  USPC ..................... 704/9; 704/1; 704/10

(58) Field of Classification Search
  CPC .................................. G06F 17/30719
  USPC ............. 704/1, 9; 715/252, 253, 254
  See application file for complete search history.

(56) References Cited

U.S. PATENT DOCUMENTS

| 7,052,396 | B2 | 5/2006 | Comair | |
|---|---|---|---|---|
| 7,844,594 | B1 * | 11/2010 | Holt et al. | 707/709 |
| 8,239,358 | B1 * | 8/2012 | Soubbotin | 707/706 |
| 8,281,250 | B2 * | 10/2012 | Carter et al. | 715/765 |
| 2009/0075681 | A1 | 3/2009 | Jager | |
| 2010/0145676 | A1 | 6/2010 | Rogers | |
| 2010/0199197 | A1 * | 8/2010 | Faletski et al. | 715/760 |

FOREIGN PATENT DOCUMENTS

JP  2001155014  6/2001

OTHER PUBLICATIONS

IBM "Enhancing a Text Editor with Synonym Selection for Shortening Texts and Speeches" ip.com, IPCOM000176628D, (Nov. 19, 2008), 3 pages.
"Acrolinx" available at: http://www.acrolinx.com/acrolinx_iq_en.html, last accessed Sep. 14, 2012, 2 pages.
Kitagawa et al. "A Fast and Compact Method for Document Summarization on Mobile Devices using Non-Negative Matrix Factorization" 2011 2nd International Conference on Networking and Information Technology, vol. 17 (2011), pp. 150-157.

* cited by examiner

*Primary Examiner* — Jesse Pullias
(74) *Attorney, Agent, or Firm* — Jeffrey T. Holman

(57) ABSTRACT

A method for linguistical analytic consolidation is described. The method includes displaying a user interface on a mobile device. The method also includes receiving source text content to display in the user interface. The method also includes scanning the source text content for a specific element. The method also includes flagging the specific element of the source text content to be modified according to a set of linguistic rules. Modifying the specific element according to the set of linguistic rules results in a consolidated form of the source text content.

17 Claims, 4 Drawing Sheets

LINGUISTICAL ANALYTIC CONSOLIDATION FOR MOBILE CONTENT

BACKGROUND

Writing and communicating via a mobile environment, especially smart phones, can be very difficult and complex due to the small screen real estate. Writing for a mobile environment takes time and careful consideration of each word. While content for desktop environments may also be edited to specific size/length requirements, reusing content written for consumption in a desktop environment may need to be modified for optimal viewing in the mobile environment. Additional requirements for translation or globalization are frequently considered, as well.

Because content providers may provide content for both desktop and mobile environments, content providers may use intelligent assistance and linguistic analytics to support the task of making content compatible for viewing in the mobile environment. In some cases, in which content provider staff sizes continue to decrease and staff responsibilities increase, the need for the intelligent assistance and linguistic analytics may also increase to continue providing sufficient content for both desktop and mobile environments.

SUMMARY

Embodiments of a method are described. In one embodiment, the method is a method for linguistical analytic consolidation is described. The method includes displaying a user interface on a mobile device. The method also includes receiving source text content to display in the user interface. The method also includes scanning the source text content for a specific element. The method also includes flagging the specific element of the source text content to be modified according to a set of linguistic rules. Modifying the specific element according to the set of linguistic rules results in a consolidated form of the source text content. Other embodiments of the method, a system, and a computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
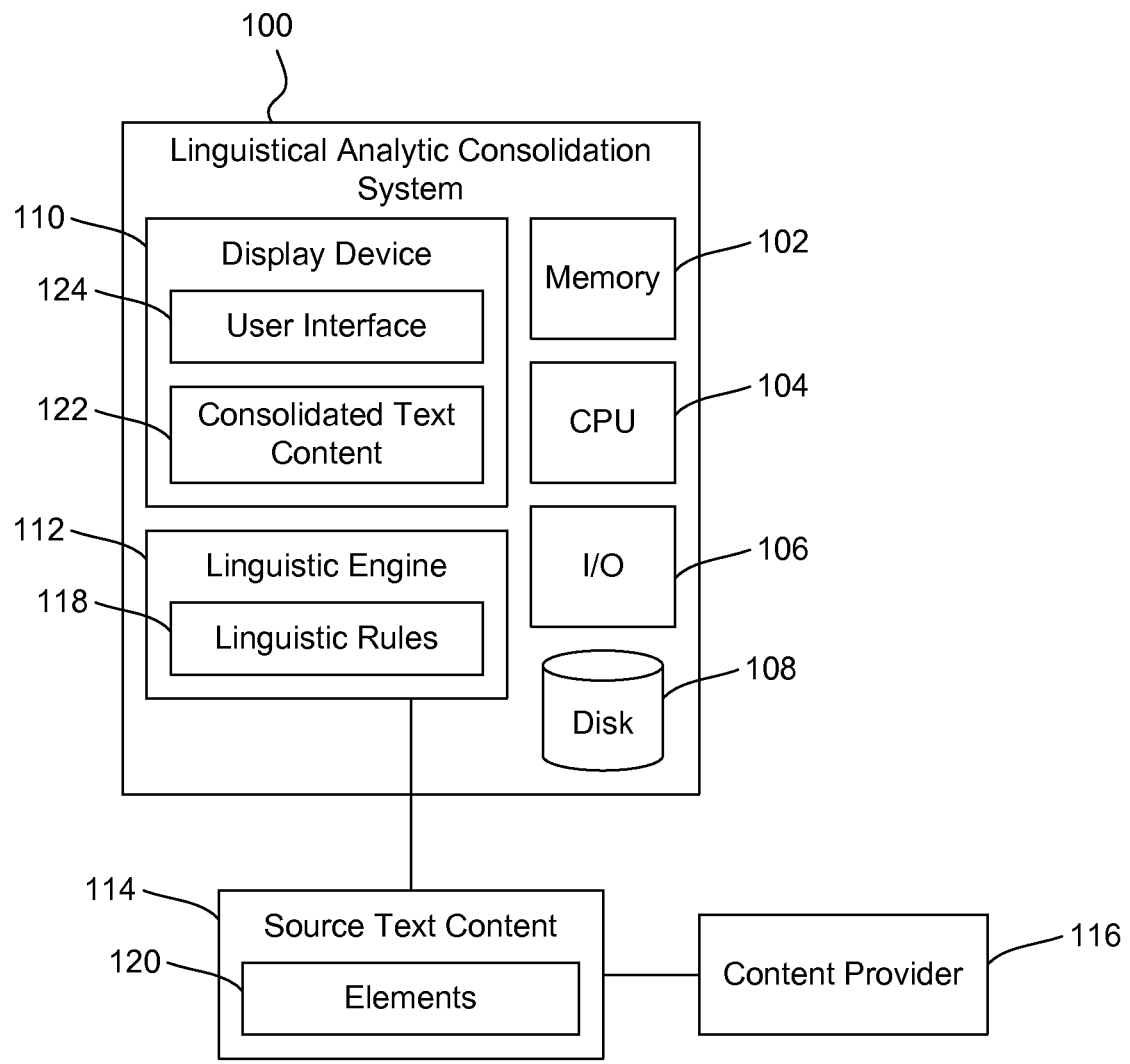
FIG. 1 depicts a schematic diagram of one embodiment of a linguistic analytic consolidation system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for linguistical analytic consolidation. More specifically, the system analyzes text content to determine words, phrases, or other elements in the text content which may be modified either by removing or replacing the elements to consolidate the text content. In one embodiment, the system consolidates text content written for a desktop environment for viewing in a mobile environment. In another embodiment, the system indicates to a content author ways in which text content written by the content author may be improved for a mobile environment.

Some conventional systems for intelligent linguistic analysis recognize grammatical structures and semantic relations to detect errors and inconsistencies and to suggest some improvements and compliance. Other conventional systems for intelligent linguistic analysis include summarizing long documentation for mobile environments through non-negative matrix factorization algorithms or other methods. However, the conventional systems are limited in how much assistance is offered to the content author or content provider.

Consequently, a system and method that offers suggestions to a content author/manager for replacing or removing specific words or phrases in the content may reduce the length of the content and improve the visual presentation of the content for display in a mobile environment. The system and method may consolidate the content by eliminating unnecessary elements of the content or replacing specific elements with better representations while retaining overall meaning. The assistance may reduce the time a content provider needs to craft meaningful and communicative content from existing desktop information.

Figure 4:
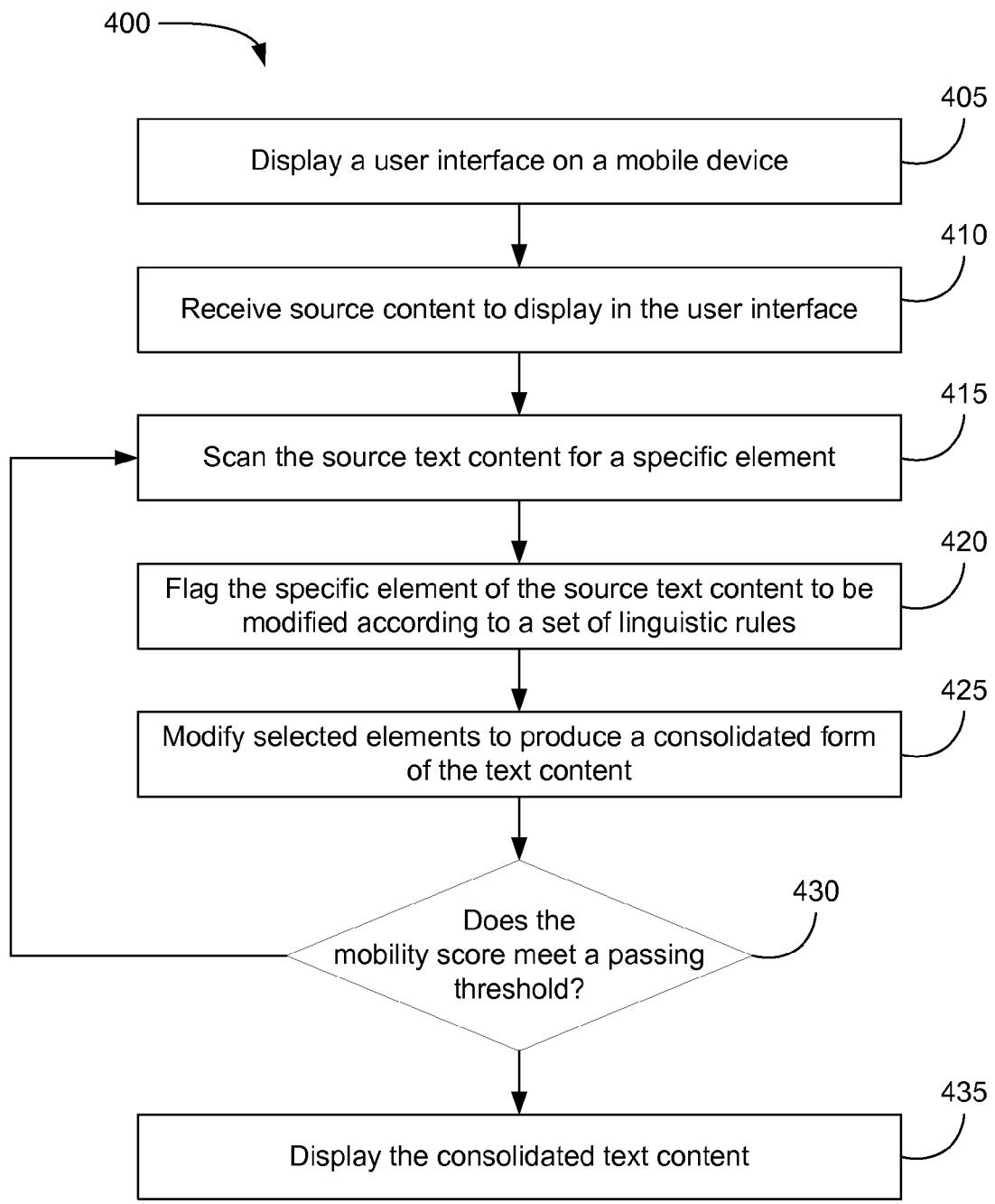
FIG. 4 depicts a flowchart diagram of one embodiment of a method for linguistical analytic consolidation.

FIG. 1 depicts a schematic diagram of one embodiment of a linguistical analytic consolidation system, also referred to herein as a consolidation system 100. The depicted consolidation system 100 includes various components, described in more detail below, that are capable of performing the functions and operations described herein. In one embodiment, at least some of the components of the consolidation system 100 are implemented in a computer system. For example, the functionality of one or more components of the consolidation system 100 may be implemented by computer program instructions stored on a computer memory device 102 and executed by a processing device 104 such as a CPU. The consolidation system 100 may include other components, such as input/output devices 106, a disk storage drive 108, a display device 110, and a linguistic engine 112. Some or all of the components of the consolidation system 100 may be stored on a single computing device or on a network of computing devices, including a wireless communication network. The consolidation system 100 may include more or fewer components or subsystems than those depicted herein. In some embodiments, the consolidation system 100 may be used to implement the methods described herein as depicted in FIG. 4.

The linguistic engine 112 receives source text content 114. In one embodiment, the consolidation system 100 receives the source text content 114 from a device outside the consolidation system 100. In another embodiment, the source text content 114 is produced by a device or engine within the consolidation system 100 and sent to the linguistic engine 112. The source text content 114 may be analyzed by the consolidation system 100 at any point during or after the source text content 114 is produced. The source text content 114 may be processed locally or pre-processed at an external device prior to importing the source text content 114 into the linguistic engine 112.

For example, the source text content 114 may be produced by a content provider 116 (such as a content author) and the consolidation system 100 may check the source text content 114 continuously or periodically while the source text content 114 is still being produced. In another example, the source text content 114 may have been produced previously by the content provider 116, such as for a desktop environment, and the consolidation system 100 analyzes the source text content 114 to determine how the source text content 114 may be improved for a mobile environment.

In one embodiment, the linguistic engine 112 uses a set of linguistic rules 118 to analyze the source text content 114. The linguistic rules 118 may be based on natural language patterns, which may identify different elements 120 in the source text content 114, for example, by parsing sentences into words or phrases and identifying particular language structures. In other embodiments, the linguistic rules 118 may be based on other language patterns for analyzing any type of structured or unstructured content.

The linguistic engine 112 uses the linguistic rules 118 to determine specific elements 120 of the source text content 114 that may be removed or replaced to consolidate the source text content 114 for a mobile environment. The linguistic engine 112 may provide suggestions for modifying the specific elements 120 to the content provider 116, such as by suggesting which elements 120 may be removed without affecting the overall meaning of the source text content 114 or suitable replacements to consolidate the source text content 114. Because the source text content 114 may include structured data, the linguistic rules 118 may parse the structured data to determine structured elements of the source text content 114 that may be removed or replaced.

In one embodiment, the content provider 116 uses the suggestions from the linguistic engine 112 to create a consolidated form of the source text content 114. The consolidated form may be displayed in any environment, though the consolidated form may be written specifically for mobile environments or other environments with small display real estate. In another embodiment, the consolidation system 100 may automatically consolidate the source text content 114 to produce the consolidated form of the source text content 114.

In one embodiment, the consolidation system 100 adds alternate text or metadata, or both, to be rendered differently depending on the display device 110. For example, the consolidated form of the source text content 114 may be added to the source text content 114 with conditional flags that result in the consolidated form being displayed in response to detecting that the display device 110 corresponds to a mobile device, and the full source text content 114 is displayed in response to detecting that the display device 110 corresponds to a desktop device. The consolidation system 100 may include any number of different forms of the source text content for display on any number of different devices.

After consolidating the source text content 114, consolidated text content 122 may be configured to be displayed in a user interface 124 on the display device 110. This may include formatting the consolidated text content 122 for viewing in a browser or other application of a mobile environment. A content consumer may then view the consolidated text content 122 on a mobile device, such as a smart phone, tablet, or other mobile device, though the consolidated text content 122 may be viewed on any type of display device 110.

Figure 2:
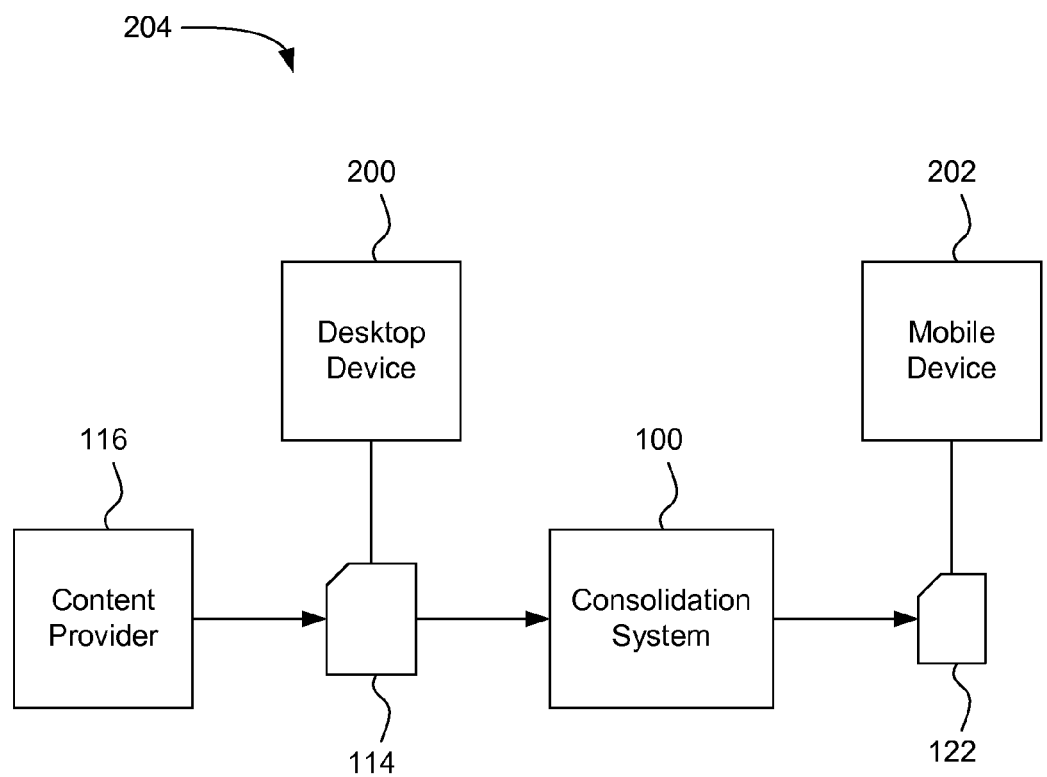
FIG. 2 depicts a flowchart diagram of one embodiment of a method for linguistical analytic consolidation.

FIG. 2 depicts a flowchart diagram of one embodiment of a method 204 for linguistical analytic consolidation. While the method 204 is described in conjunction with the linguistical analytic consolidation system 100 of FIG. 1, the method 204 may be used in conjunction with any linguistical analytic consolidation system 100.

In one embodiment, source text content 114 is created by the content provider 116 for viewing on a desktop device 200. The desktop device 200 may be a desktop computing device with a display screen configured to display a user interface 124 to a user. The display device 110 may be any size. Desktop displays can be any size, and many tend to be much larger than mobile displays for smart phones, tablets, or similar mobile devices. Due to the larger display size, the desktop display may show much more content at one time than mobile devices. In other embodiments, the desktop device 200 may be replaced with a laptop or other similar device, which may be mobile but outputs a display sufficiently large to display content configured for a desktop device 200.

The consolidation system 100 then receives the source text content 114 from the content provider 116. The consolidation system 100 may be on the computing device where the source text content 114 is created or on a separate computing device. The consolidation system 100 processes the source text content 114 to consolidate the source text content 114 for viewing in a mobile environment. The consolidation system 100 may consolidate the source text content 114 by scanning the content for elements 120 which may be removed or replaced to reduce the word count or character count of the source text content 114 or otherwise optimize the source text content 114 for a mobile environment.

After consolidating the source text content 114 to produce consolidated content, the consolidated content may be delivered to a mobile device 202 to be displayed in a user interface 124 on the mobile device 202. The consolidated content may be encoded or otherwise configured for display in the user interface 124 of the mobile device 202. For example, the consolidated content may be inserted into code corresponding to a particular application.

Figure 3:
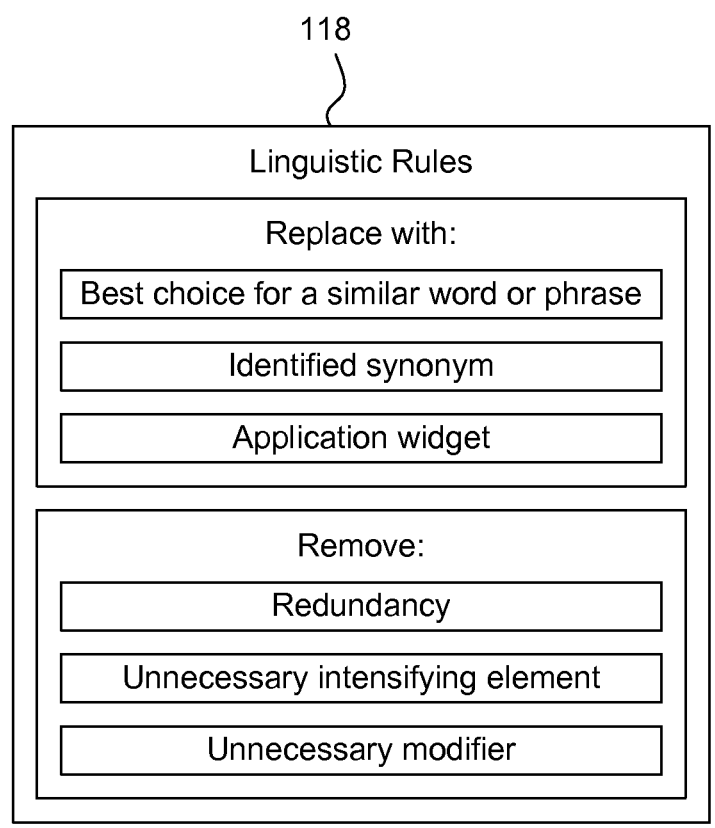
FIG. 3 depicts a schematic diagram of one embodiment of a set of linguistic rules.

FIG. 3 depicts a schematic diagram of one embodiment of a set of linguistic rules 118. While the set of linguistic rules 118 is depicted in conjunction with the consolidation system 100 of FIG. 1, the linguistic rules 118 may be used in conjunction with any consolidation system 100.

The consolidation system 100 may use one or more linguistic rules 118 to determine suggestions or to make corrections to the source text content 114. The elements 120 are then modified according to the linguistic rules 118 to create a consolidated form of the source text content 114. The linguistic rules 118 may be based on natural language processing techniques or other language processing techniques. In some embodiments, the linguistic rules 118 may be used to provide suggestions to the content provider 116 to revise the source text content 114. In other embodiments, the linguistic rules 118 may be used to automatically revise the source text content 114.

Elements 120 in the source text content 114 that may be modified by the consolidation system 100 may include sentences, phrases, words or links. In one embodiment, the linguistic rules 118 include rules to replace elements 120 in the source text content 114 with other elements 120. For example, the linguistic rules 118 may include a rule to replace a specific element 120 with a best choice for a similar element, such as a similar word or phrase that is shorter than the specific element 120. In one example, the linguistic rules 118 may include a rule to replace the specific element 120 with an identified synonym to the specific element 120. In one example, the linguistic rules 118 may include a rule to replace a specific element 120 with an application widget. This may include replacing a string of text associated with or referencing a particular application widget stored on a mobile device 202 with an icon or other representation of the application widget.

In one embodiment, the linguistic rules 118 include rules to remove specific elements 120 from the source text content 114. In one example, the linguistic rules 118 may include a rule to remove redundancies from the source text content 114. In one example, the linguistic rules 118 may include a rule to remove unnecessary intensifying elements 120. In one example, the linguistic rules 118 may include a rule to remove unnecessary modifiers. In any of the examples described herein, the modifications made to the source text content 114, whether by replacing or removing elements 120, retain the basic meaning of the source text content 114.

The linguistic rules 118 may include any combination of the rules described herein, as well as any combination of additional rules not described explicitly herein. In some embodiments, the source text content 114 may be passed through the consolidation system 100 multiple times using the linguistic rules 118 to verify that the resulting consolidated text content 122 is optimized for a mobile environment.

FIG. 4 depicts a flowchart diagram of one embodiment of a method 400 for linguistical analytic consolidation. While the method 400 is described in conjunction with the consolidation system 100 of FIG. 1, the method 400 may be used in conjunction with any type of consolidation system 100.

In one embodiment, the consolidation system 100 displays 405 a user interface 124 on a mobile device 202. The mobile device 202 may be any mobile computing device with a display device 110, including, but not limited to, a mobile phone, a tablet computing device, a media player/device, and other mobile devices 202. The user interface 124 may be an operating system or any application interface within an operating system that allows a user to view content on the display device 110.

The consolidation system 100 receives 410 source text content 114 to display in the user interface 124. The source text content 114 may include any content for displaying in a computing environment, including text, links, pictures, and other digital content. The consolidation system 100 then scans 415 the source text content 114 for specific elements 120. The specific elements 120 may be determined based on language processing techniques. The elements 120 may be part of natural language or some other language, including short hand or coding languages.

The consolidation system 100 flags 420 the specific elements 120 in the source text content 114 to be modified according to a set of linguistic rules 118. In some embodiments, the linguistic rules 118 may be part of the language processing techniques used to identify the specific elements 120. In other embodiments, the linguistic rules 118 may be separate from the language processing techniques used to scan the source text content 114 for specific elements 120. Modifying the specific elements 120 of the source text content 114 according to the set of linguistic rules 118 results in a consolidated form of the source text content 114. The consolidated form of the course text content may include fewer characters than the source text content 114.

In one embodiment, the set of linguistic rules 118 includes a rule to modify a specific element 120 by replacing the specific element 120 with at least one of several replacement elements. The replacement elements may include a best choice for a similar element, an identified synonym for the specific element, and an application widget. The replacement elements may include additional elements 120 not described herein.

In one embodiment, the set of linguistic rules 118 includes a rule to modify the specific element 120 by removing at least one of several specific elements 120. The specific elements 120 to be removed may include identified redundancies, identified intensifying elements, and identified unnecessary modifiers. The specific elements 120 to be removed may include additional elements 120 not described herein.

In one embodiment, the specific elements 120 that are flagged for modification are displayed to the content provider 116. The consolidation system 100 is configured to receive an input from the content provider 116 to modify 425 selected elements 120 from the specific elements 120. The content provider 116 may select any of the specific elements 120 flagged by the consolidation system 100 to modify. The consolidation system 100 then modifies the selected elements 120 to produce the consolidated form of the source text content 114. The source text content 114 may be modified by the content provider 116 via the consolidation system 100, for example, by accepting or declining suggestions by the consolidation system 100. The source text content 114 may alternatively be modified automatically by the consolidation system 100.

In one embodiment, the consolidation system 100 generates a mobility score for the source text content 114 and returns a report to the content provider 116. The mobility score describes a compatibility of the source text content 114 for display on a mobile device 202. The mobility score may be based on weighted elements or thresholds in the source text content 114 for display on the mobile device 202. The mobility score may provide a metric to show progress to the content provider 116, so that the content provider 116 may use the mobility score to improve the source text content 114, for example, by writing more succinctly. The consolidation system 100 may show trends for the metric associated with the mobility score so that the content provider 116 may learn how to best improve the text content or future text content.

In some embodiments, the consolidation system 100 may generate a mobility score for the consolidated text content 122 after modifications have been performed on the original source text content 114. The consolidation system 100 may check 430 the mobility score against a passing threshold. If the mobility score for the consolidated text content 122 does not meet the passing threshold, some or all of the operations of the method described herein may be performed on the consolidated text content 122 as many times as required to meet the passing threshold for the mobility score. When the consolidation system 100 determines that the mobility score meets the passing threshold, the source text content 114 or consolidated text content 122 has a passing mobility score and may be configured to be displayed 435 on a mobile device 202.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

An embodiment of a consolidation system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
   a computer readable storage medium to store a computer readable program, wherein the computer readable program, when executed by a processor within a computer, causes the computer to perform operations for linguistical analytic consolidation, the operations comprising:
   displaying a user interface on a mobile device;
   receiving source text content to display in the user interface;
   scanning the source text content for a specific element;
   generating a mobility score for the source text content, wherein the mobility score describes a compatibility of the source text content for display on a device; and
   flagging the specific element of the source text content to be modified according to a set of linguistic rules, wherein modifying the specific element according to the set of linguistic rules results in a consolidated form of the source text content.

2. The computer program product of claim 1, wherein the set of linguistic rules comprises a rule to modify the specific element by replacing the specific element with at least one of:
   a best choice for a similar element;
   an identified synonym; and
   an application widget.

3. The computer program product of claim 1, wherein the set of linguistic rules comprises a rule to modify the specific element by removing the specific element, wherein the specific element comprises at least one of:
   an identified redundancy;
   an identified intensifying element; and
   an identified unnecessary modifier.

4. The computer program product of claim 1, wherein the computer readable program, when executed on the computer, causes the computer to perform additional operations, comprising:
   displaying the specific elements flagged for modification to a content provider;
   receiving an input from the content provider to modify selected elements from the specific elements; and
   modifying the selected elements to produce the consolidated form of the source text content.

5. The computer program product of claim 1, wherein the mobility score is based on weighted elements in the text content, wherein the source text content comprises a passing mobility score in response to the mobility score meeting a passing threshold.

6. The computer program product of claim 1, wherein the consolidated form of the source text content comprises fewer characters than the source text content.

7. A method for linguistical analytic consolidation, the method comprising:
   displaying a user interface on a mobile device;
   receiving source text content to display in the user interface;
   scanning the source text content for a specific element;
   generating a mobility score for the source text content, wherein the mobility score describes a compatibility of the source text content for display on a device; and
   flagging the specific element of the source text content to be modified according to a set of linguistic rules, wherein modifying the specific element according to the set of linguistic rules results in a consolidated form of the source text content.

8. The method of claim 7, wherein the set of linguistic rules comprises a rule to modify the specific element by replacing the specific element with at least one of:
   a best choice for a similar element;
   an identified synonym; and
   an application widget.

9. The method of claim 7, wherein the set of linguistic rules comprises a rule to modify the specific element by removing the specific element, wherein the specific element comprises at least one of:
   an identified redundancy;
   an identified intensifying element; and
   an identified unnecessary modifier.

10. The method of claim 7, further comprising:
    displaying the specific elements flagged for modification to a content provider;
    receiving an input from the content provider to modify selected elements from the specific elements; and
    modifying the selected elements to produce the consolidated form of the source text content.

11. The method of claim 7, wherein the mobility score is based on weighted elements in the text content, wherein the source text content comprises a passing mobility score in response to the mobility score meeting a passing threshold.

12. The method of claim 7, wherein the consolidated form of the source text content comprises fewer characters than the source text content.

13. A linguistical analytic consolidation system, comprising:
- a display device configured to display a user interface on a mobile device; and
- a linguistic engine configured to:
  - receive source text content to display in the user interface;
  - scan the source text content for a specific element;
  - generate a mobility score for the source text content, wherein the mobility score describes a compatibility of the source text content for display on a device; and
  - flag the specific element of the source text content to be modified according to a set of linguistic rules, wherein modifying the specific element according to the set of linguistic rules results in a consolidated form of the source text content.

14. The system of claim 13, wherein the set of linguistic rules comprises a rule to modify the specific element by replacing the specific element with at least one of:
- a best choice for a similar element;
- an identified synonym; and
- an application widget.

15. The system of claim 13, wherein the set of linguistic rules comprises a rule to modify the specific element by removing the specific element, wherein the specific element comprises at least one of:
- an identified redundancy;
- an identified intensifying element; and
- an identified unnecessary modifier.

16. The system of claim 13, wherein the linguistic engine is further configured to:
- display the specific elements flagged for modification to a content provider;
- receive an input from the content provider to modify selected elements from the specific elements; and
- modify the selected elements to produce the consolidated form of the source text content.

17. The system of claim 13, wherein the mobility score is based on weighted elements in the text content, wherein the source text content comprises a passing mobility score in response to the mobility score meeting a passing threshold.

* * * * *